(12) United States Patent
Wilke

(10) Patent No.: US 8,751,742 B2
(45) Date of Patent: Jun. 10, 2014

(54) MEMORY CARD HAVING EXTENDED DATA STORAGE FUNCTIONALITY

(75) Inventor: Johannes Wilke, Langerwehe (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 486 days.

(21) Appl. No.: 13/078,265

(22) Filed: Apr. 1, 2011

(65) Prior Publication Data

US 2012/0254536 A1 Oct. 4, 2012

(51) Int. Cl.
*G06F 12/00* (2006.01)

(52) U.S. Cl.
USPC ............ 711/115; 711/118; 711/159; 711/133

(58) Field of Classification Search
USPC .......................................... 711/115, E12.001
See application file for complete search history.

(56) References Cited

U.S. PATENT DOCUMENTS

| | | | |
|---|---|---|---|
| 6,405,278 B1 | 6/2002 | Liepe | |
| 6,592,032 B1 | 7/2003 | Takaragi et al. | |
| 7,536,203 B2 * | 5/2009 | Elwan et al. | 455/558 |
| 7,702,821 B2 | 4/2010 | Feinberg et al. | |
| 2003/0077067 A1 * | 4/2003 | Wu et al. | 386/52 |
| 2004/0139233 A1 | 7/2004 | Kellerman et al. | |
| 2005/0157568 A1 * | 7/2005 | Teicher | 365/195 |
| 2007/0073894 A1 * | 3/2007 | Erickson et al. | 709/230 |
| 2007/0073937 A1 * | 3/2007 | Feinberg et al. | 710/62 |
| 2007/0104112 A1 * | 5/2007 | Sayers et al. | 370/252 |

FOREIGN PATENT DOCUMENTS

WO   WO 2009/009106 A1   1/2009

* cited by examiner

*Primary Examiner* — Reginald Bragdon
*Assistant Examiner* — Mehdi Namazi

(57) ABSTRACT

A method of extending memory card data storage capacity to a remote data store includes storing an initial data item received from a host device in a local memory cache, and wirelessly transmitting the initial data item from the local memory cache to the remote data store via a network interface that includes at least one wireless communication transceiver. The method also includes substituting a corresponding, smaller transcoded data item received from the remote data store for the initial data item in the local memory cache.

6 Claims, 11 Drawing Sheets

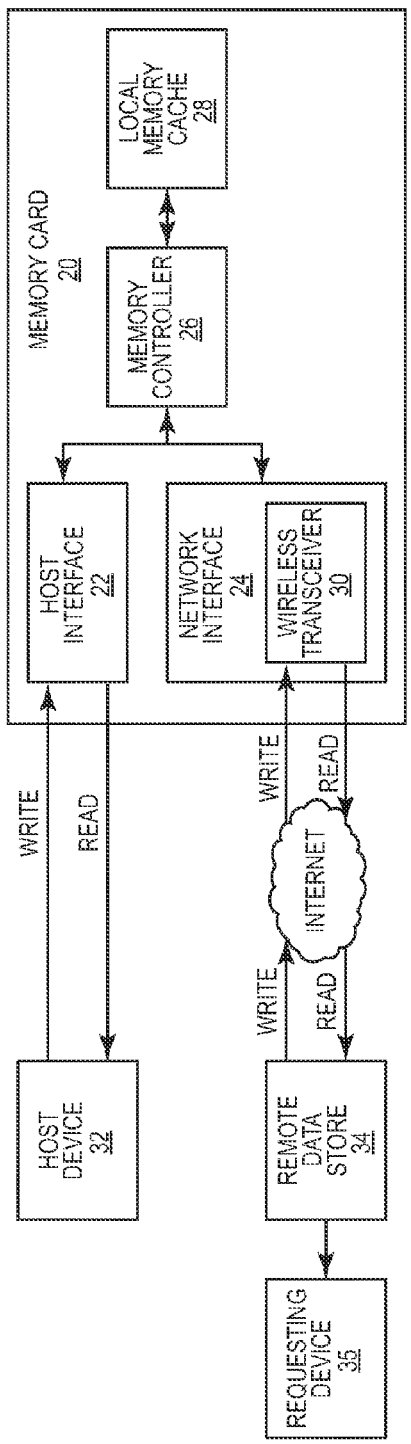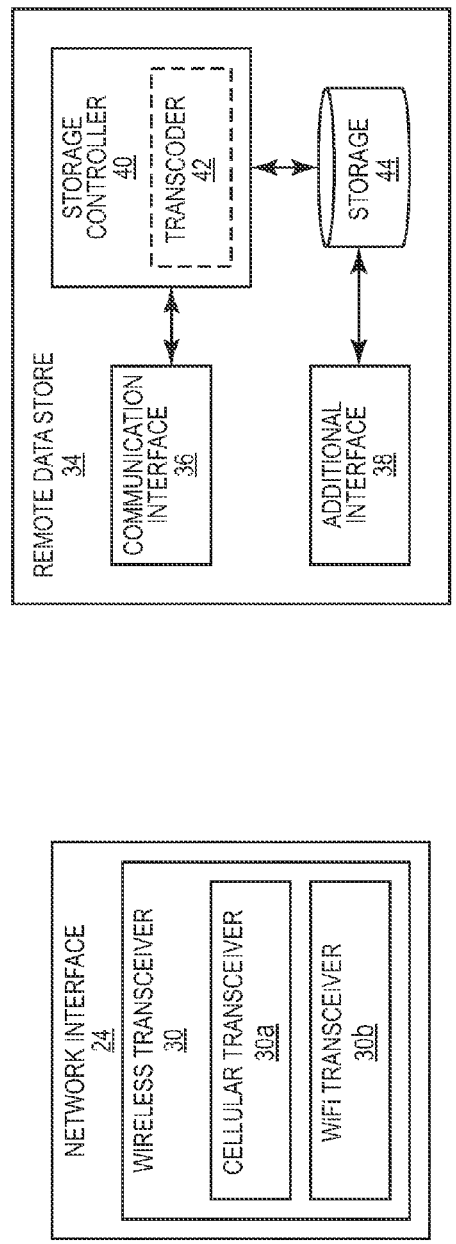

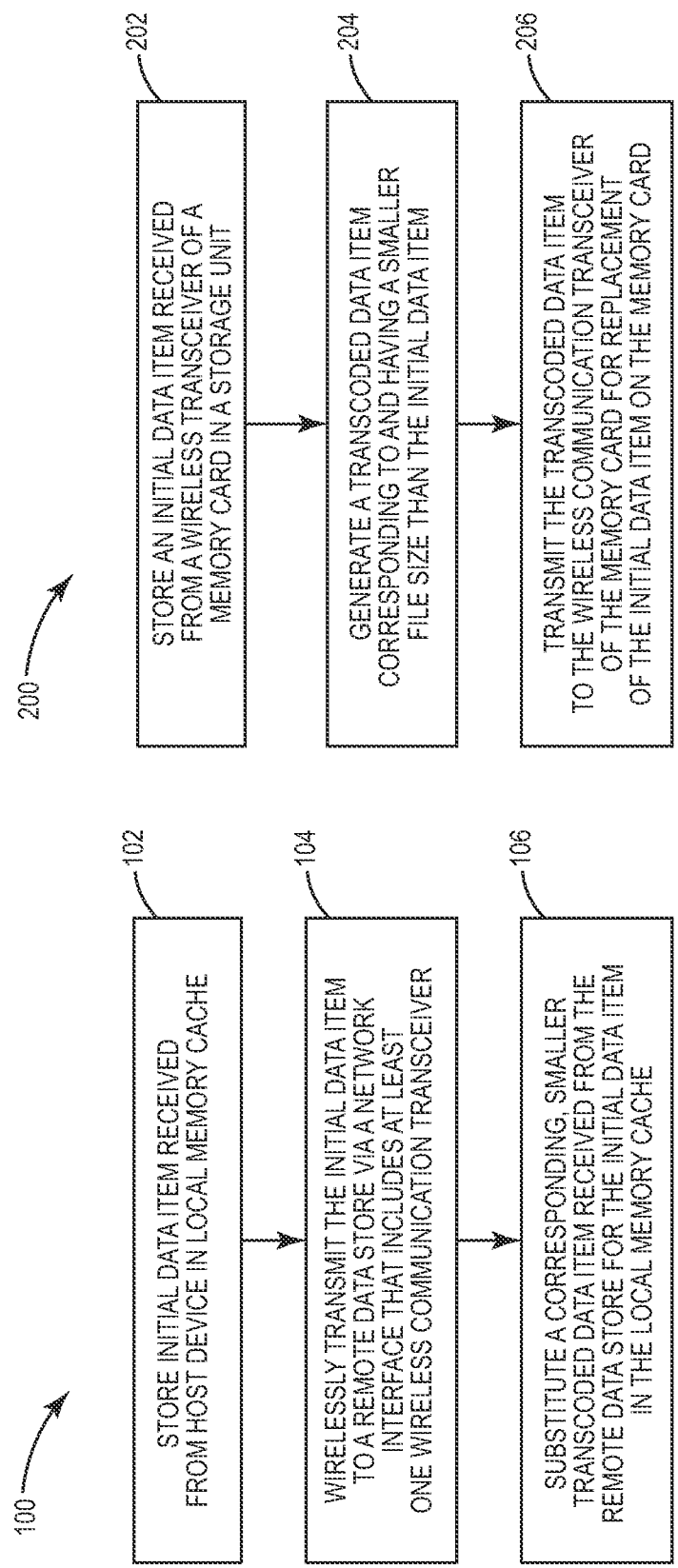

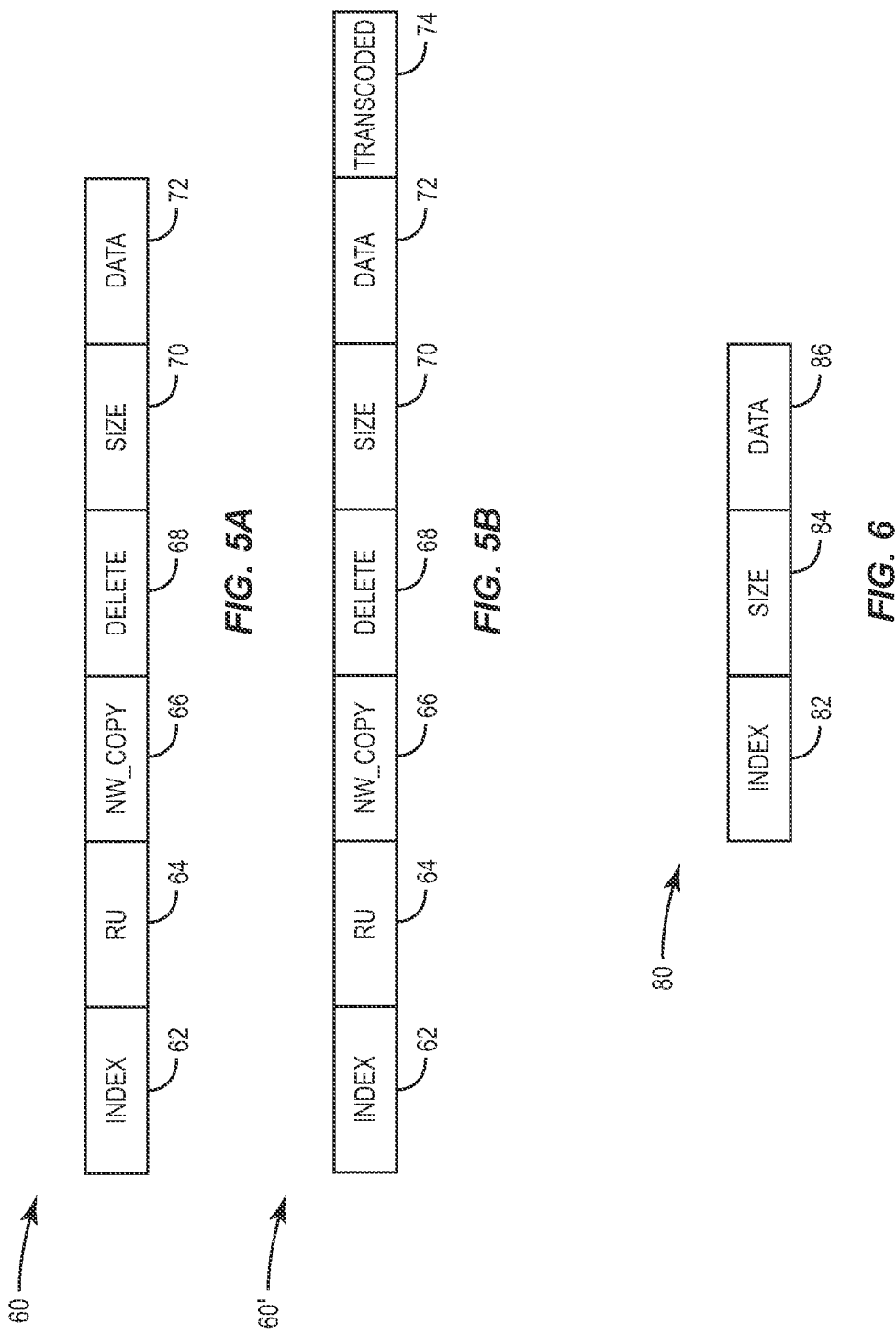

US 8,751,742 B2

MEMORY CARD HAVING EXTENDED DATA STORAGE FUNCTIONALITY

TECHNICAL FIELD

The present invention generally relates to memory cards, and particularly relates to extending the data storage capacity of a memory card to a remote data store.

BACKGROUND

Many consumer devices, such as cameras and video cameras, rely on memory cards to store data items, such as photographs and videos. Memory cards have a standardized interface for read/write options that offers predefined storage and access functions to consumer devices. Consumer devices (or "host devices") often provide playback features through which a user can access their memory card via the standardized memory card interface to review their photos or videos on the host device.

Memory cards have a finite amount of data storage capacity, and therefore inherently limit the amount of data items that a host device can store at any given time. Thus, users are often forced to either to delete saved data items or use a plurality of memory cards. To partially address this problem, the prior art teaches wirelessly copying or transferring local data items to an external storage device. However, data item copying does not address memory card capacity limitations, and data item transfer leads to the undesirable loss of local access and convenient recall of transferred data items.

SUMMARY

A method for extending memory card data storage capacity to a remote data store facilitates the substitution of initial data items received from a host device with corresponding, smaller transcoded data items, with the transcoding being performed by a remote data store.

This storage arrangement advantageously increases available memory in the memory card and creates backup storage copies of initial data items, while still making transcoded data items available for review on the host device.

According to one non-limiting embodiment, a memory card configured to extend its data storage capacity to a remote data store includes a host interface configured to communicate with a host device, a local memory cache configured to store an initial data item received through the host interface, and a network interface including at least one wireless communication transceiver configured to communicate with a remote data store. The memory card also includes a memory controller configured to send the initial data item to the remote data store that stores the initial data item and generates a corresponding, smaller transcoded data item. The memory controller is configured to substitute the transcoded data item for the initial data item in the local memory cache.

According to one non-limiting embodiment, a method of extending memory card data storage capacity to a remote data store includes storing an initial data item received from a host device in a local memory cache, and wirelessly transmitting the initial data item from the local memory cache to the remote data store via a network interface that includes at least one wireless communication transceiver. A corresponding, smaller transcoded data item received from the remote data store is substituted for the initial data item in the local memory cache.

According to one non-limiting embodiment, the remote data store is configured to extend the data storage capacity of a memory card and includes a communication interface configured to receive an initial data item from a wireless communication transceiver of a memory card. The remote data store also includes a transcoder configured to generate a transcoded data item corresponding to and having a smaller file size than the initial data item, and includes a storage controller. The storage controller is configured to store the initial data item in a storage unit, and to transmit the transcoded data item to the wireless communication transceiver of the memory card for replacement of the initial data item on the memory card.

According to one non-limiting embodiment, a method implemented in a data store of extending the data storage capacity of a memory card remote from the data store stores an initial data item received from a wireless transceiver of a memory card in a storage unit, and generates a transcoded data item corresponding to and having a smaller file size than the initial data item. The transcoded data item is transmitted to the wireless communication transceiver of the memory card for replacement of the initial data item on the memory card.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of one embodiment of a memory card configured to extend its data storage capacity to a remote data store.

FIG. 1a is a block diagram of one embodiment of a network interface of the memory card of FIG. 1.

FIG. 1b is a block diagram of one embodiment of the remote data store of FIG. 1.

FIG. 2 is a logic flow diagram of one embodiment of a method of extending memory card data storage capacity to a remote data store.

FIG. 3 is a logic flow diagram of one embodiment of a method in a data store of extending the data storage capacity of a memory card remote from the data store.

FIG. 5a is a block diagram of one embodiment of a memory card substitution history index.

FIG. 5b is a block diagram of another embodiment of a memory card substitution history index.

FIG. 6 is a block diagram of one embodiment of a remote data store data item index.

DETAILED DESCRIPTION

Figure 4A:
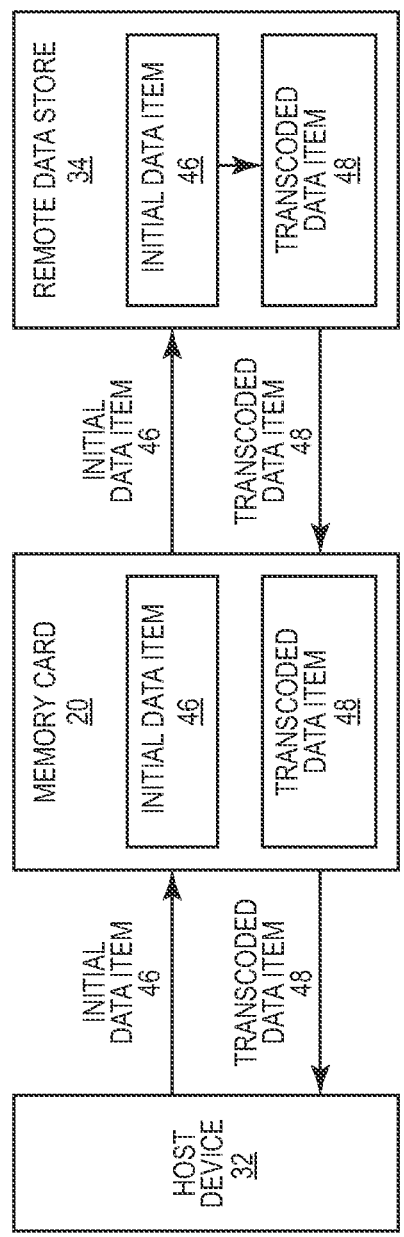
FIG. 4a is a block diagram of one embodiment of a flow of data items between a host device, the memory card and the remote data store.

FIG. 1 is a block diagram of one embodiment of a memory card 20 configured to extend its data storage capacity to a remote data store 34. The memory card 20 includes a host interface 22 configured to communicate with a host device 32. A local memory cache 28 is configured to store an initial data item 46 (see FIG. 4) received through the host interface 22. A network interface 24 includes at least one wireless communication transceiver 30 configured to communicate with the remote data store 34. A memory controller 26 is configured to send the initial data item 46 to the remote data store 34. The remote data store 32 stores the initial data item 46 and generates a corresponding, smaller transcoded data item 48 (see FIG. 4). The memory controller 26 is configured to substitute the transcoded data item 48 for the initial data item 46 in the local memory cache 28.

This transcoding storage arrangement advantageously increases available memory in the memory card 20 and creates backup storage copies of initial data items 46 in the remote data store 34, while still making transcoded data items 48 in local memory cache 28 available for the host device 32 to review. Thus, the memory card 20 may be configured to act as a cache for the host device 32, ultimately substituting received initial data items 46 for corresponding, smaller transcoded data items 48, with the larger, initial data items 46 being stored remotely in the remote data store 34.

In one embodiment, if the memory card 20 does not have network access, the memory card 20 reports its storage capacity to the host device 32 as including only the local memory cache 28. In one embodiment, if the memory card 20 has network access, the memory card 20 reports its storage capacity to the host device 32 not as the size of the local memory cache 28, but instead as including the size of an allocated portion of the remote data store 34.

Referring again to FIG. 1, some non-limiting examples of host devices 32 include a digital camera, video camera, or an mp3 player, and some corresponding non-limiting examples of initial data items 46 include digital photographs, digital videos, or digital audio files received from their respective host device 32. The memory card 20 may be constructed to fit a common memory card form factor, such as Secure Digital (SD), microSD, xD, CompactFlash (CF), etc. Thus, the host interface 22 may be a corresponding interface for one or more of these formats. The memory card 20 may be configured for compatibility with any device capable of reading from its respective form factor. If the memory card 20 is configured as an SD card, the memory card 20 appears to the host device 32 as any other memory card would, and the host device 32 does not need not be aware of the transcoding capabilities of the memory card 20 in order for the transcoding to occur.

FIG. 2 is a logic flow diagram of one embodiment of a method 100 of extending memory card 20 data storage capacity to the remote data store 34. The memory card 20 stores an initial data item 46 received from the host device 32 in the local memory cache 28 (step 102). The memory card 20 wirelessly transmits the initial data item 46 from the local memory cache 28 to the remote data store 34 via the network interface 24 that includes at least one wireless communication transceiver 30 (step 104). The memory card 20 then substitutes a corresponding, smaller transcoded data item 48 received from the remote data store 34 for the initial data item 46 in the local memory cache 28 (step 106).

The memory card 20 is configured to transmit the transcoded data item 48 to the host device 32 based on a host device request for the initial data item 46 (e.g. for viewing on the host device 32). This transmission may include, for example, a transfer over a memory card interface of the host device 32. In one example the transcoded data item 48 is optimized for display on the host device 32 (e.g. transcoding includes resizing or an image or compressing a video for viewing on a display of the host device 32). Of course these are only examples, and the remote data store 34 could be configured to perform other transcoding (e.g., converting an image from color to black and white, performing color improvement on the image, etc.). In one example, the host device 32 is an audio recording and playback device, and the transcoding performed by the remote data store 34 includes compressing a sound file.

The memory card 20 includes a network interface 24 that the memory controller 26 uses to send initial data items 46 to the remote data store 34, and to receive transcoded data items 48 from the remote data store 34. FIG. 1a is a block diagram of one embodiment of the network interface 24 of the memory card 20. The network interface includes at least one wireless transceiver 30 operable to communicate wirelessly with the remote data store 34. In one example, the at least one wireless transceiver 30 of the memory card 20 includes a first, cellular wireless communication transceiver 30a and a second, WiFi wireless communication transceiver 30b. In this example, the memory controller 26 is configured to select a transceiver for wireless communication with the remote data store 34 based on at least one of receiving a user preference or detecting an available network connection.

The cellular transceiver 30a is configured to wirelessly communicate with the remote data store 34 via a cellular data network using cellular radio technology, with the cellular network having connectivity to a wide area network, such as the Internet. Some example cellular radio technologies includes Global System for Mobile Communications (GSM), Universal Mobile Telecommunications System (UMTS), Code Division Multiple Access (CDMA), and 3GPP Long Term Evolution (LTE). Of course these are only examples, and it is understood that other cellular radio technologies could be used by the cellular transceiver 30a.

In one example, the memory card 20 obtains access to a cellular network by being associated with a cellular phone plan. Thus, the memory card 20 and/or the memory card's access to the cellular network may be sold to a user as an add-on to a new or existing cellular phone plan. Of course this is only an example, and it is possible that the memory card may be granted cellular network access without being associated with a cellular phone.

The WiFi transceiver 30b is configured to wirelessly communicate over a local area network, which may in turn be connected to a WAN (e.g. the Internet). Although FIG. 1 illustrates the memory card 20 communicating via the Internet. It is understood that the Internet is only one example of a possible wide area network (WAN) that could be used to communicate with the remote data store 34. Also, it is understood that the inclusion of both transceivers 30a-b is only an example, and it the memory card 20 could alternatively include only one of the transceivers 30a, 30b.

FIG. 3 is a logic flow diagram of one embodiment of a method 100, implemented in the remote data store 34, of extending memory card data 20 storage capacity to the remote data store 34. The remote data store 34 receives an initial data item 46 from the wireless transceiver 30 of the memory card 20, and stores the initial data item 46 in the storage unit 44 (step 202). The remote data store 34 generates a transcoded data item 48 corresponding to and having a smaller file size than the initial data item 46 (step 204). Then, the remote data store 34 transmits the transcoded data item 48 to the wireless communication transceiver 30 of the memory card 20 for replacement of the initial data item 46 on the memory card 20 (step 206).

FIG. 1b is a block diagram of one embodiment of the remote data store 34 of FIG. 1 that is configured to extend the data storage capacity of the memory card 20. The remote data store 34 includes a communication interface 36, a storage controller 40 and associated transcoder 42, a storage unit 44, and may include one or more additional interfaces 38. The communication interface 36 is configured to receive an initial data item from the wireless communication transceiver 30 of the memory card 20. The transcoder 42 is configured to generate a transcoded data item 48 corresponding to and having a smaller file size than the initial data item 46. The storage controller 40 is configured to store the initial data item 46 in the storage unit 44, and is configured to transmit the transcoded data item 48 to the wireless communication transceiver 30 of the memory card 20 for replacement of the initial data item 46 on the memory card 20. The storage unit 44 may include a magnetic storage medium, optical storage medium, or both, for example. Although the remote data store 34 is illustrated as only being in communication with a single memory card 20, this is only an example, and it is understood that the remote data store 34 may perform data storage and transcoding for a plurality of memory cards 20, allocating a portion of the storage unit 44 to each of the memory cards 20.

The communication interface 36 receives the initial data items 46 from the memory card 20, and transmits the transcoded data items 48 to the memory card 20. The communication interface 36 provides network connectivity to a network, such as the Internet (see FIG. 1). Storage controller 40 includes a transcoder configured to perform the transcoding of initial data items 46, and configured to store the non-transcoded initial data items 46 in the storage unit 44. The remote data store 34 may also include additional interfaces to facilitate retrieval of the initial data items 46. For example, the additional interface may include web server functionality to enable users to login and retrieve data items from the remote data store 34. In one example the remote data store 34 may include, or may function as one or more web servers.

In one example, the storage controller 40 is configured to transmit an indication of successful receipt and storage of the initial data item 46 to the wireless communication transceiver 30 of the memory card 20. In one example, in addition to storing the initial data item 46, the storage controller 40 is also configured to store the transcoded data item 48 in the storage unit 44.

In one embodiment, the storage controller 40 is configured to receive a data item request from a requesting device 35 other than the memory card 20 (e.g. via additional interfaces 38), to authenticate the requesting device 35 based on received requesting device 35 credentials, and to transmit an initial data item 46, a corresponding transcoded data item 48, or both, to the requesting device 35 based on the data item request. The requesting device 35 may include a PC or other computer, for example.

The memory controller 26 and storage controller 40 may be implemented in dedicated or otherwise fixed circuitry, or may be implemented in programmable digital processing circuitry, or in some combination of the two. For example, in at least one embodiment, each of the memory controller 26 and storage controller 40 comprise one or more computer-based circuits, such as one or more microprocessor-based circuits that are configured to operate as the memory controller 26 or the storage controller 40 based on the execution of computer program instructions stored in a memory or other computer-readable medium in or accessible to the memory card 20 or remote data store 34 (e.g., storage unit 44, local memory cache 28). Other types of digital processing circuitry, such as FPGAs or ASICs, are also contemplated for use in implementing the controllers 26, 40.

Further, in one or more embodiments, each of the network interface 24, communication interface 36, and additional interfaces 38 comprise one or more interface circuits, which may comprise a combination of physical interface circuits and logical control circuits, for implementing particular communication protocols. Additionally, it will be understood that the communication interfaces 24, 36, 38 may comprise plural interfaces, for communicating according to different protocols, or for communicating with different entities, e.g., a base station in a Radio Access Network (RAN) that is part of a cellular communication network.

FIG. 4a is a block diagram of one embodiment of a flow of data items between the host device 32, the memory card 20 and the remote data store 34. The host device 32 transmits an initial data item 46 to the memory card 20, and the memory card selectively transfers the initial data item 46 to the remote data store 34 for storage and transcoding. The remote data store 34 stores the initial data item 46 and transcodes the initial data item 46 to create transcoded data item 48, and transmits the transcoded data item 48 to the memory card 20. The memory card 20 substitutes the initial data item 46 with the transcoded data item 48 in the local memory cache 28.

Figure 4B:
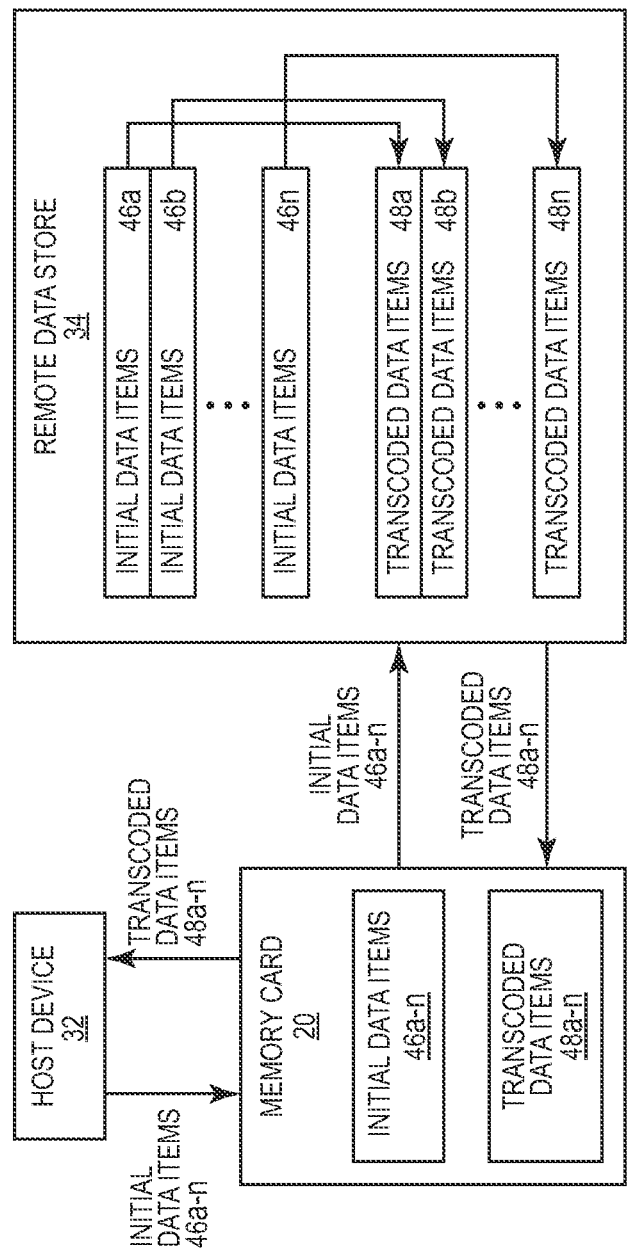
FIG. 4b is a block diagram of one embodiment of a flow of a plurality of data items between the host device, the memory card and the remote data store.

FIG. 4b is a block diagram of one embodiment of a flow of a plurality of data items between the host device 32, the memory card 20 and the remote data store 34. As shown in FIG. 2b, both initial data items 46 and transcoded data items 48 may be transmitted and transcoded in groups.

FIG. 5a is a block diagram of one embodiment of a memory card substitution history index 60. The index 60 may be stored in the local memory cache 28, for example. The index 60 includes an index value 62, a recently used indication 64 (RU), and a network copy indication 66 (NW_COPY). The index value 62 identifies the data item in question with a unique value. The RU indication 64 indicates how recently an initial data item 46 was accessed by the host device 32, how many times an initial data item 46 was accessed by the host device 32, or both, and may optionally be used in deciding which initial data items 46 to transmit to the remote data store 34 for transcoding. Thus, in one embodiment the memory controller 26 is configured to store in the index 60 a counter value (RU indication 64) indicating how many times an initial data item 46 has been requested by the host device 32 within a time period, and the memory controller 26 performs the substitution (step 106) for initial data items 46 having a lower counter value 64 prior to performing said substitution (step 106) for initial data items 46 having a higher counter value 64.

The network copy indication 66 (NW_COPY) indicates whether the initial data item 46 is stored in the remote data store 34. In one example NW_COPY may have a first value for data items that have not been submitted to the remote data store 34, have a second value for data items that have been transmitted to the remote data store 34, or have a third value for data items for which the remote data store 34 has confirmed successful receipt and storage.

The index 60 also includes a deletion indication 68, a data item size 70, and a data portion 72. The deletion indication 68 may be used to flag a data item for which deletion has been requested. For example, if the host device 32 commands the memory card 20 to delete a given data item, the delete flag 68 may be used to indicate a pending deletion of the corresponding initial data item 46 stored on the remote data store 34. Once a successful deletion has been indicated by the remote data store 34, the corresponding entry in index 60 may be either deleted or flagged for overwriting. The size indication 70 may indicate the size of an initial data item 46, the size of a corresponding transcoded data item 48, or both. The data portion 72 may be used to store the actual data item in question in its initial or transcoded state. Of course this is only an example, and it is understood that the data portion 72 may simply be a pointer to a location in the local memory cache 28 where the data item is stored.

FIG. 5b is a block diagram of an embodiment of a memory card substitution history index 60' that includes a transcoded indication 74 indicating whether a data item has been successfully transcoded and received back from the remote data store 34. Thus, the memory controller 26 is in one or more embodiments configured to store a substitution history (see, e.g., transcoded indication 74) in the index 60' in the local memory cache 28.

FIG. 6 is a block diagram of one embodiment of a remote data store 34 data item index 80 that includes an index value 64, a size indication 84, and a data portion 86. The index value 64 identifies the data item in question. The size indication 84 indicates the size of an initial data item 46, the size of a corresponding transcoded data item 48, or both. The data portion 86 may store the actual data item in question, or may be a pointer to a location in memory where the data item is stored.

Referring again to FIG. 1, the memory controller 26 is configured to receive a data item deletion request from the host device 32, and responsive to that request is configured to delete a transcoded data item 48 from the local memory cache 28 and to signal the remote data store 34 to delete its copy of the initial data item 46 corresponding to that transcoded data item 48. From the perspective of the remote data store 34, the storage controller 40 is configured to delete an initial data item 46 from the storage unit 44 based on receiving a deletion signal from the memory card 20, and is configured to transmit an indication of a successful deletion to said wireless communication transceiver 30 of the memory card 20. As discussed above, the remote data store 34 may store both initial data items 46 and their corresponding transcoded data items 48. In one example, if signaled to delete an initial data item 46, the remote data store 34 also deletes a copy of the corresponding transcoded data item 48 stored in the remote data store 34.

In one example, the memory controller 26 is configured to receive a data item deletion request from the host device 32, to record a status (see deletion indication 68) of the deletion request in the index 60, and to repeatedly submit the data item deletion request to the remote data store 34 until a notification is received from the remote data store indicating that the remote data store 34 has deleted its copy of the initial data item 46. Correspondingly, in this embodiment the storage controller 40 is configured to delete the initial data item 46 from the storage unit 44 based on receiving the deletion signal from the memory card 20, and is configured to transmit an indication of a successful deletion to the wireless communication transceiver 30 of the memory card 20.

The memory controller 26 of the memory card 20 may be configured to only transmit initial data items 46 for transcoding, or to only perform the substitution of step 106 in response to trigger conditions. In one example, the memory controller 26 is configured not to perform the transmission and substitution of steps 104, 106 until the local memory cache 28 reaches a predefined storage threshold. The predefined storage threshold may correspond to a quantity of initial data items being stored in the local memory cache 28, or may correspond to a threshold percentage of data storage capacity of the memory card 20 having been met, for example.

In one embodiment, the memory card 20 has a first set of features for host devices 32 that are unaware of its wireless communication features, and has a second set of features for host devices 32 that are aware of its wireless communication features. In this embodiment, a host device's awareness of the memory card's wireless communication features may depend on the firmware of the host device 32. For a host device 32 unaware of the wireless communication features, the host device 32 would treat the memory card as being standard memory card 20 corresponding to the form factor of the memory card 20 and the host interface 22. However, for a host device 32 aware of the wireless communication features of the memory card 20, the host device 32 may have access to additional features, such as modifying transcoding settings (e.g., what transcoding is performed, the threshold at which transcoding occurs, etc.).

Figure 7:
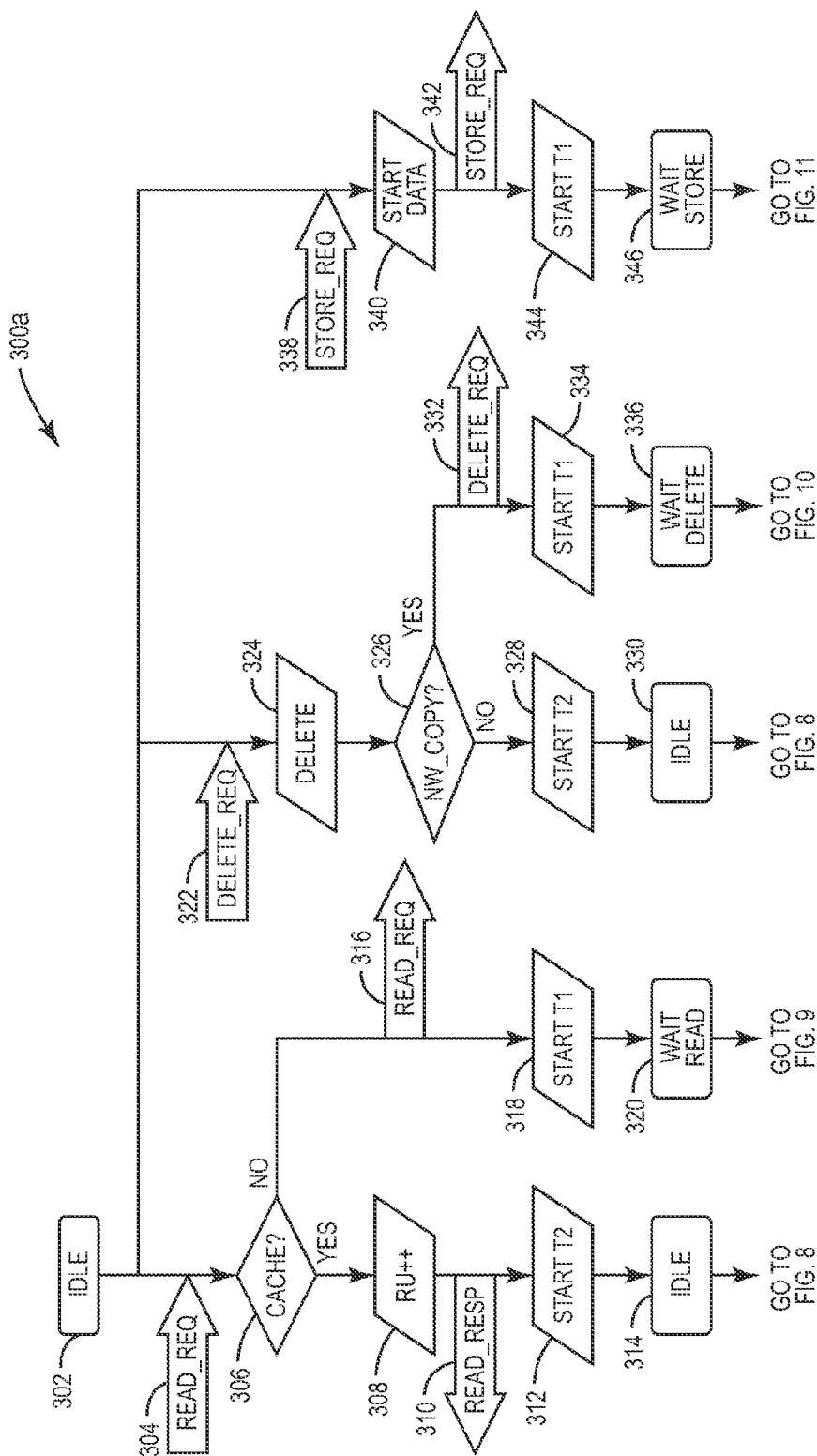
FIGS. 7-11 are logic flow diagrams one or more embodiments of methods implemented by a memory controller of the memory card of FIG. 1.

FIGS. 7-11 are logic flow diagrams one or more embodiments of methods 300a-e implemented by the memory controller of the card 20. Referring to FIG. 7, the memory controller 26 is in an idle state (step 302). Upon receiving a read request (step 304) from the host device 32, a check is performed if the requested data item is stored in the local memory cache 28 (step 306). If the data item is available in the local memory cache 28 (e.g. as either an initial data item 46 or a transcoded data item 48), then the recently used indication 64 (RU) is incremented (step 308), the requested data item is transmitted to the host device 32 (step 310), a timer T2 is started (step 312), and the memory controller 26 returns to the idle state (step 314). If, however, the requested data item is not available in the local memory cache 28, then the memory controller 26 requests a copy of the data item from the remote data store 34 (step 316), a timer T1 is started (step 318), and a "wait read" procedure is commenced (step 320) (see FIG. 9). In one example the timer T1 has a shorter corresponding time period than the timer T2.

If a delete request is received from the host device 32 (step 322), then a data item deletion is commenced (step 324). A check is performed to determine if a copy of the data item is stored in the remote data store 34 (step 326). If there is no copy of the data item in question in the remote data store 34, then the timer T2 is started (step 328), and the memory controller 26 returns to the idle state (step 330). However, if there is a copy of the data item in the remote data store 34, then the memory controller 26 signals the remote data store 34 to delete that copy (step 332), the timer T1 is started (step 334), and a "wait delete" procedure is commenced (step 336) (see FIG. 10).

If a request is received from the host device 32 to store an initial data item 46 (step 338), then the memory controller 26 stores the initial data item in the local memory cache 28 (step 340) and transmits the initial data item 46 to the remote data store 34 for transcoding (step 342), possibly in response to one or more of the trigger conditions described above. The timer T1 is started (step 344), and a "wait store" procedure is commenced (step 346) (see FIG. 11).

Figure 8:
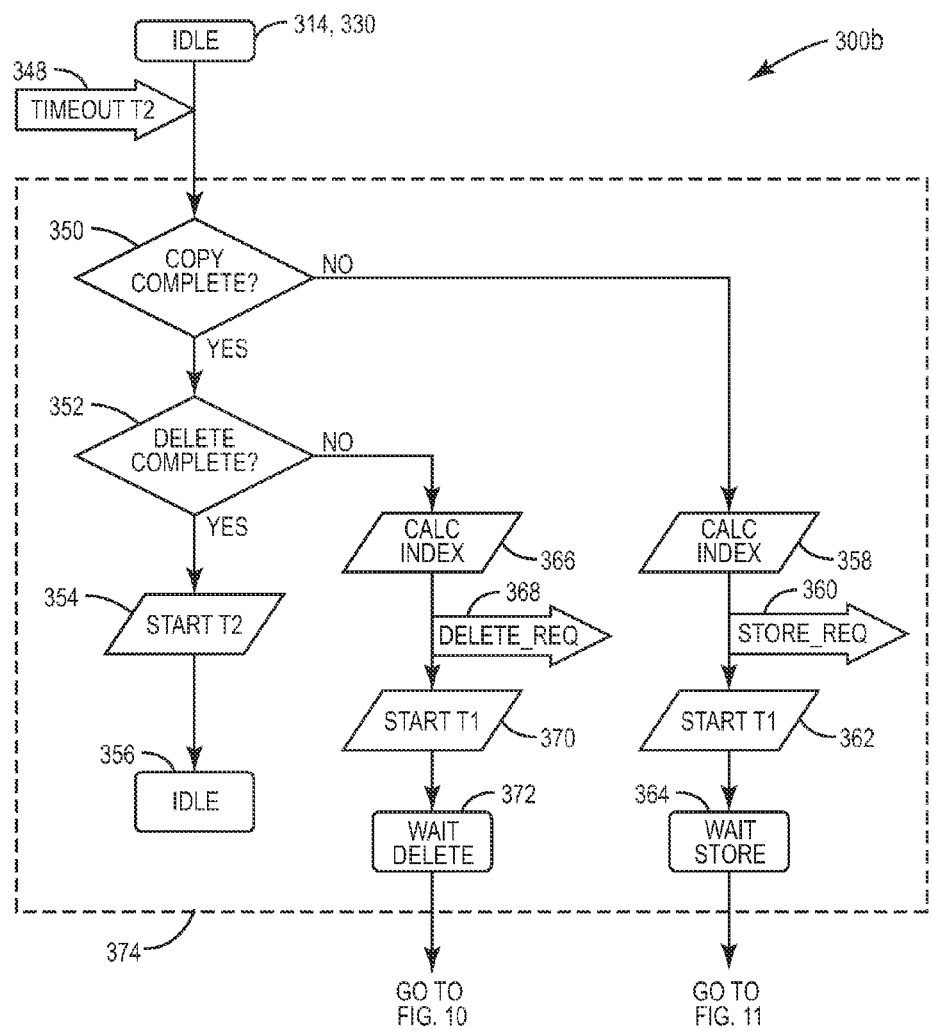

Referring to FIG. 8, from the idle state (e.g., step 314 or step 330) the timer T2 transpires (step 348), and a check is performed to see if a pending data item transmission to remote data store 34 from step 342 (if one exists) was completed successfully (step 350) and/or if a pending data item deletion from step 332 (if one exists) was completed successfully (step 352). If these checks 350, 352 determine successful completions, then the timer T2 is started (step 354) and the memory controller 26 returns to the IDLE state (step 356). Thus, the "Yes" associated with step 350 indicates either that a pending transmission from step 342 was successful, or that no transmission from step 342 was pending. Similarly, the "Yes" associated with step 352 indicates either that a pending deletion from steps 332 was successful, or that no deletion from step 332 was pending.

Figure 11:
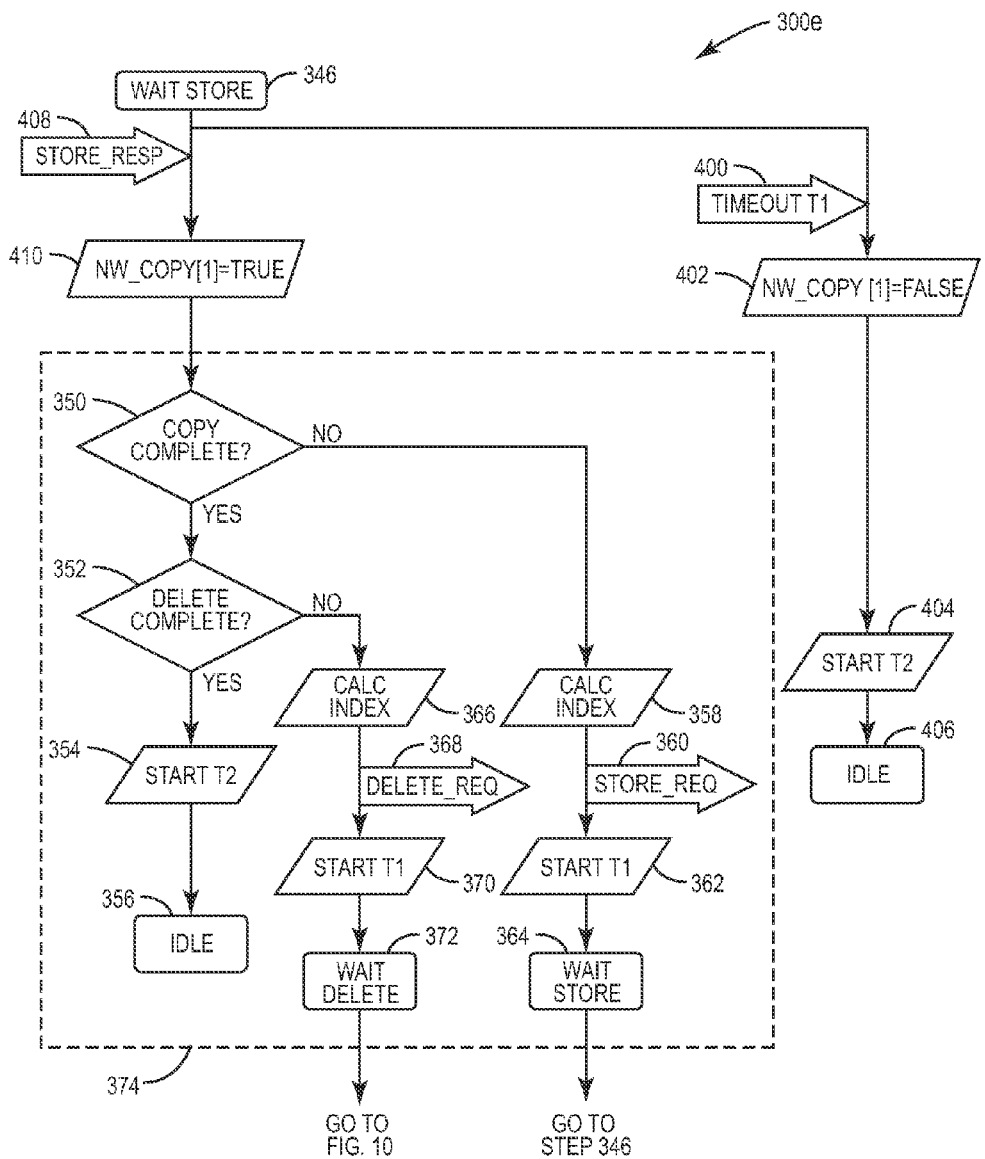

If a pending transmission of step 342 was not successful, then the network copy indication 66 (NW_COPY) of memory card substitution history index 60 (see FIGS. 5a-b) is updated to reflect the failed and/or pending transmission (step 358), the memory controller 26 retransmits the initial data item 46 to the remote data store 34 for transcoding (step 360), the timer T1 is started (step 362), and the "wait store" procedure is commenced (step 364) (see FIG. 11).

If a pending deletion on the remote data store 34 of step 332 was not successful, then the deletion indication 68 of memory card substitution history index 60 (see FIGS. 5a-b) is updated to reflect the status of the failed and/or pending deletion (step 366), the memory controller 26 repeats its signaling to the remote data store 34 to delete its stored copy of the initial data item (step 368), the timer T1 is started (step 370), and the "wait delete" procedure is commenced (step 372). For the discussion of FIGS. 9-11, the reference numeral 374 will be used to collectively refer to steps 350-372.

Figure 9:
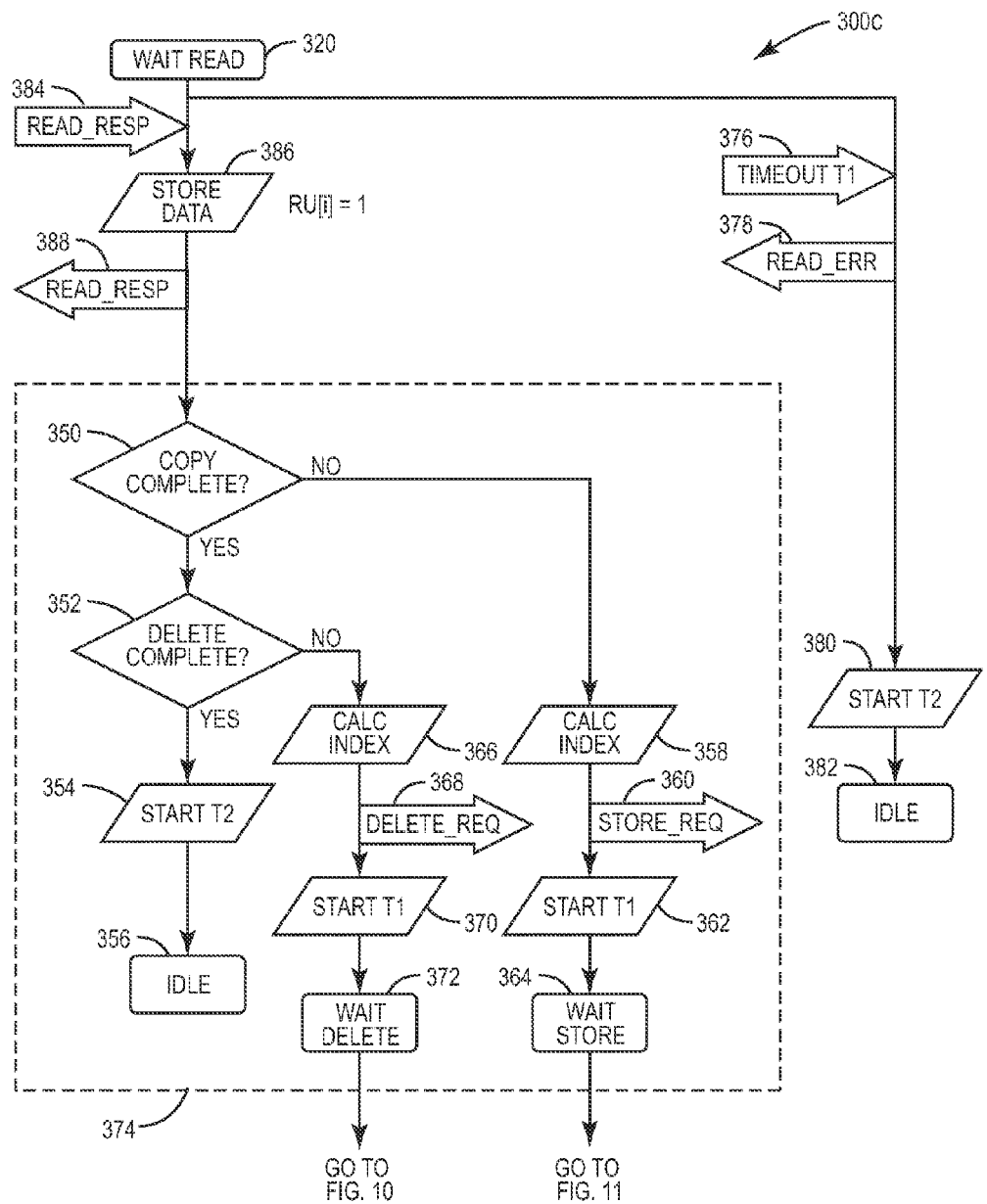

Referring to FIG. 9, the "wait read" procedure is initiated (step 320). If the timer T1 transpires (step 376) prior to receiving a requested data item from the remote data store 34 (step 384), then the memory controller 26 returns an error to the host device 32 (step 378), the timer T2 is started (step 380), and the memory controller 26 enters the idle state (step 382). However, if the requested data item is received from the remote data store 34 (step 384) before T1 transpires (step 376), then the memory controller 26 stores the requested data item in the local memory cache 28 and increments the recently used indication 64 (RU) for the data item in question (step 386), the requested data item is transmitted to the host device 32 (step 388) (optionally the transcoded data item 48 and not the initial data item 46), and steps 374 are performed.

Figure 10:
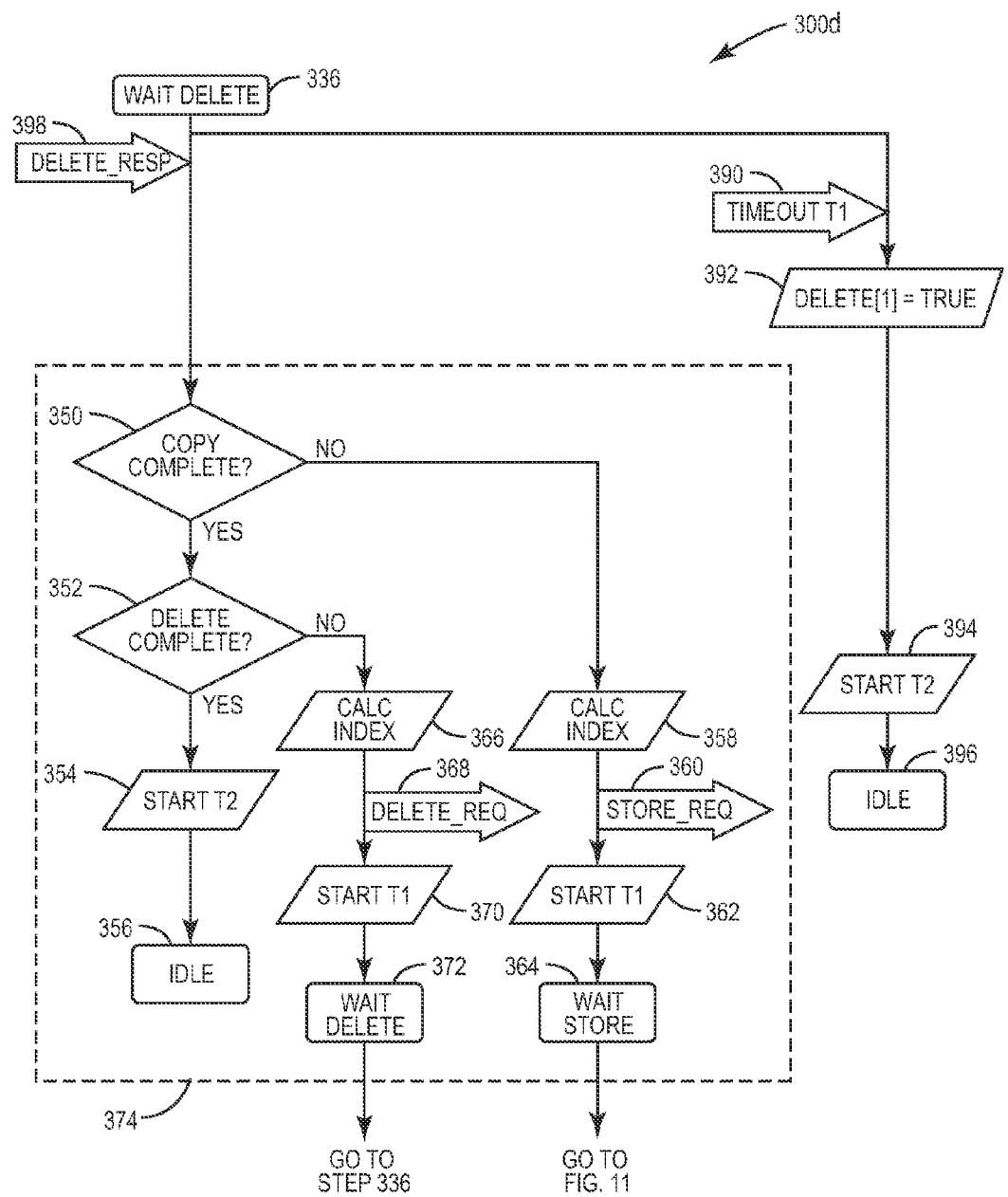

Referring to FIG. 10, the "wait delete" procedure is commenced (step 336). If the timer T1 transpires (step 390) prior to receiving a deletion confirmation from the remote data store 34 (step 398), then the memory controller 26 assumes that the deletion was successful (step 392), the timer T2 is started (step 394), and the memory controller 26 enters the idle state (step 396). However, if the deletion confirmation is received from the remote data store 34 (step 398) before T1 transpires (step 390), then steps 374 are performed.

Referring to FIG. 11, the "wait store" procedure is commenced (step 346). If the timer T1 transpires (step 400) prior to the remote data store 34 confirming receipt of a data item (step 408), then the network copy indication 66 (NW_COPY) is updated to indicate a failed data item transmission (step 400), timer T2 is started (step 404), and the memory controller 26 enters the idle state (step 406). However, if the remote data store 34 confirms receipt of the data item (step 408) before T1 transpires (step 400), then NW_COPY is updated to indicate a successful data item transmission (step 410) and steps 374 are performed.

Figure 12:
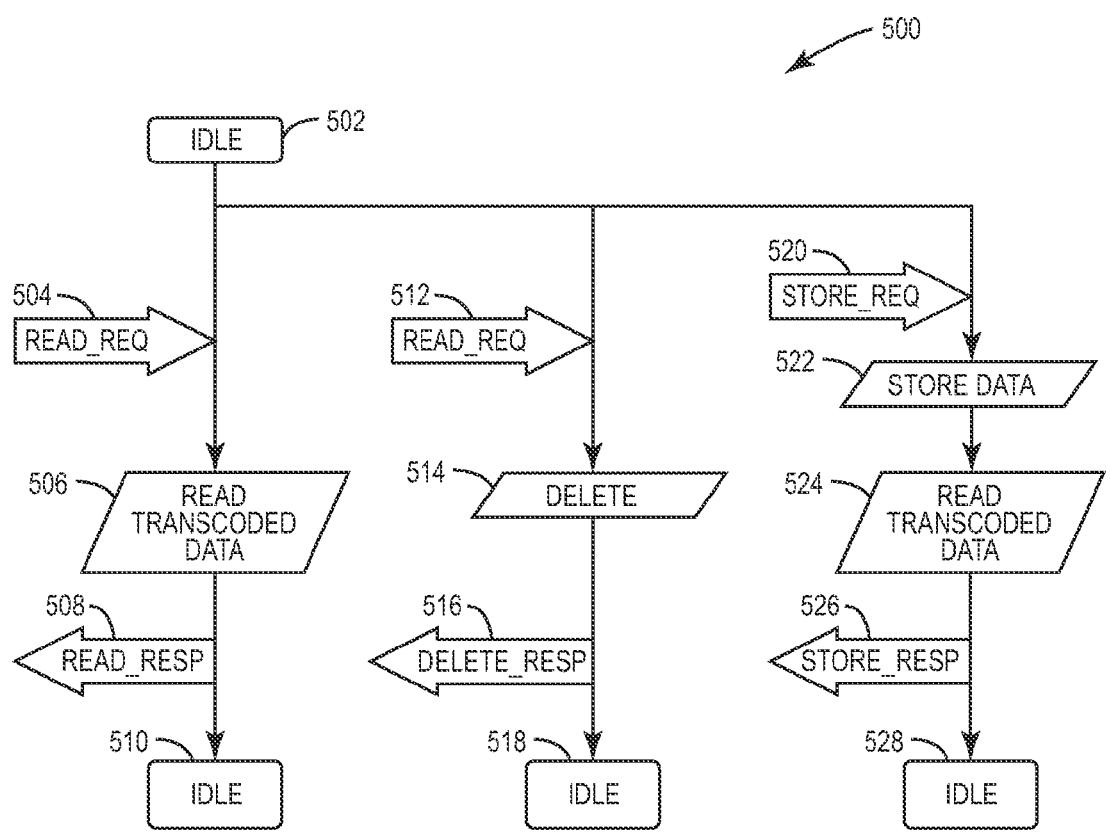
FIG. 12 is a logic flow diagram of one embodiment a method implemented by a storage controller of the remote data store.

FIG. 12 is a logic flow diagram of one embodiment a method 400 implemented by the storage controller 40 of the remote data store 34. The storage controller 40 is in an idle state (step 502). Upon receiving a read request (step 504) from the host device (see step 316 of FIG. 7), the storage controller 40 obtains a corresponding transcoded data item (step 506), transmits the transcoded data item to the memory controller 26, and enters the idle state (step 510).

Upon receiving a deletion request (step 512) from the memory controller 26 (see step 332 of FIG. 7), the storage controller 40 deletes the corresponding initial data item 46 (and transcoded data item 48 if that is also being stored in the remote data store 34) (step 514), transmits a deletion confirmation to the memory controller 26 (step 516), and enters the idle state (step 518).

Upon receiving a storage request (step 520) from the memory controller (26) (see step 342 of FIG. 7), the storage controller 40 stores a received initial data item 46 (step 522), creates and stores a corresponding transcoded data item 48 (step 524), transmits a confirmation of the storage request (step 526), and enters the idle state (step 528).

Of course, FIGS. 7-12 are only examples, and it is understood that all of the described steps in FIGS. 7-12 would not necessarily be required, and that other steps would be possible.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A memory card configured to extend its data storage capacity to a remote data store, said memory card comprising:
a host interface configured to communicate with a host device;
a local memory cache configured to store an initial data item received through the host interface;
a network interface including at least one wireless communication transceiver configured to communicate with a remote data store; and
a memory controller configured to send the initial data item to the remote data store, the remote data store stores the initial data item and, generates a corresponding, smaller transcoded data item, said memory controller being configured to substitute the transcoded data item for the initial data item in the local memory cache, wherein said memory controller is configured to store a substitution history in an index in the local memory cache and further wherein said memory controller is configured to receive a data item deletion request from the host device, to record a status of the deletion request in said index, and to repeatedly submit the data item deletion request to the remote data store until a notification is received indicating that the remote data store has deleted its copy of the initial data item.

2. A memory card configured to extend its data storage capacity to a remote data store, said memory card comprising:
a host interface configured to communicate with a host device;
a local memory cache configured to store an initial data item received through the host interface;
a network interface including at least one wireless communication transceiver configured to communicate with a remote data store; and
a memory controller configured to send the initial data item to the remote data store, the remote data store stores the initial data item and generates a corresponding, smaller transcoded data item, said memory controller being configured to substitute the transcoded data item for the initial data item in the local memory cache, wherein said memory controller is configured to store a substitution history in an index in the local memory cache and further wherein said memory controller is configured to store in said index a counter value indicating how many times an initial data item has been requested by the host device within a time period, and wherein said memory controller performs said substitution for initial data items having a lower counter value prior to performing said substitution for initial data items having a higher counter value.

3. The memory card of claim 1 or 2, wherein the at least one wireless communication transceiver includes a first, cellular wireless communication transceiver and a second, WiFi wireless communication transceiver, the memory controller being configured to select a transceiver for wireless communication with the remote data store based on at least one of receiving a user preference or detecting an available network connection.

4. A method of extending memory card data storage capacity to a remote data store, comprising:
storing an initial data item received from a host device in a local memory cache;
wirelessly transmitting the initial data item from the local memory cache to a remote data store via a network interface that includes at least one wireless communication transceiver;
and substituting a corresponding, smaller transcoded data item received from the remote data store for the initial data item in the local memory cache;
storing a substitution history in an index in the local memory cache;
receiving a data item deletion request from the host device;
storing in said index a status of said deletion request;
and repeatedly submitting said deletion request to the remote data store until a notification is received indicating that the remote data store has deleted its copy of the initial data item.

5. A method of extending memory card data storage capacity to a remote data store, comprising:
storing an initial data item received from a host device in a local memory cache;
wirelessly transmitting the initial data item from the local memory cache to a remote data store via a network interface that includes at least one wireless communication transceiver;
and substituting a corresponding, smaller transcoded data item received from the remote data store for the initial data item in the local memory cache;
storing a substitution history in an index in the local memory cache;
storing in said index a counter value indicating how many times an initial data item has been requested by the host device within a time period, wherein said memory controller performs said substitution for initial data items having a lower counter value prior to performing said substitution for initial data items having a higher counter value.

6. The method of claim 4 or 5, the network interface including a first, cellular wireless communication transceiver and a second, WiFi wireless communication transceiver, the method further comprising: establishing a wireless connection via one of the transceivers based on at least one of receiving a user preference or detecting an available network connection.

* * * * *

UNITED STATES PATENT AND TRADEMARK OFFICE
CERTIFICATE OF CORRECTION

| | | |
|---|---|---|
| PATENT NO. | : 8,751,742 B2 | |
| APPLICATION NO. | : 13/078265 | |
| DATED | : June 10, 2014 | |
| INVENTOR(S) | : Wilke | |

It is certified that error appears in the above-identified patent and that said Letters Patent is hereby corrected as shown below:

In the Specification

In Column 3, Line 6, delete "store 32" and insert -- store 34 --, therefor.

Signed and Sealed this
Twenty-first Day of October, 2014

Michelle K. Lee
*Deputy Director of the United States Patent and Trademark Office*